United States Patent [19]
Bernaerts

[11] 3,853,424
[45] Dec. 10, 1974

[54] LABYRINTH AIR VALVE FOR ROTOR HUB

[76] Inventor: Henry J. Bernaerts, R. F. D. 10, Box 1610, Annapolis, Md. 21401

[22] Filed: July 18, 1973

[21] Appl. No.: 380,322

[52] U.S. Cl. ................................ 416/20, 416/90
[51] Int. Cl. .......................................... B64c 27/18
[58] Field of Search ...................... 416/20, 90, 90 A

[56] References Cited
UNITED STATES PATENTS

| | | | |
|---|---|---|---|
| 1,982,968 | 12/1934 | Stalker | 416/90 A X |
| 2,686,567 | 8/1954 | Costa | 416/20 |
| 3,039,537 | 6/1962 | Heidelberg | 416/90 A X |
| 3,211,397 | 10/1965 | Laing et al. | 416/20 X |

FOREIGN PATENTS OR APPLICATIONS

| 907,625 | 3/1954 | Germany | 416/20 |
|---|---|---|---|
| 634,332 | 3/1950 | Great Britain | 416/20 |

*Primary Examiner*—Everette A. Powell, Jr.
*Attorney, Agent, or Firm*—R. S. Sciascia; Q. E. Hodges

[57] ABSTRACT

An air valve for a circulation control helicopter rotor. The valve comprises an inner member and a rotating blade-carrying outer member with an air passage between the two; the inner member can be translated to a position that is eccentric with respect to the rotating outer member to cause a cyclic variation in the amount of air received by each blade. Sealing means are provided at the entrance to each rotor blade, the preferred form being a labyrinth structure on both the inner and outer members.

14 Claims, 4 Drawing Figures

LABYRINTH SEAL NEAR
TOTAL ENGAGEMENT

LABYRINTH SEAL AFTER
INITIAL CONTACT

LABYRINTH AIR VALVE FOR ROTOR HUB

The invention described herein may be manufactured and used by or for the Government of the United States of America for governmental purposes without the payment of any royalties thereon or therefor.

BACKGROUND OF THE INVENTION

This invention relates to the field of circulation control helicopter rotors such as shown in U.S. Pat. No. 3,713,750. Briefly, a circulation control rotor is one wherein the rotor blades are rigidly fixed to the hub; the cyclic variation in lift for each blade is produced by blowing varying amounts of air or other fluid through slots in the surface of the blade, thereby increasing and decreasing its lift coefficient. A valve in the rotor hub controls the amount of air that is discharged through each rotor blade throughout the 360° of each cycle.

The prior art shows circulation control rotors with valves in the hub, but does not show positive sealing means between the non-rotating member and the rotating member which surrounds it. For some applications it may be desirable to completely block off or smoothly choke, at some point in the cycle, the air that is used for cyclic pitch control, hence some type of sealing means is necessary for these applications.

SUMMARY OF THE INVENTION

Briefly, the present invention is directed to the inclusion of sealing means at the entrance to the fluid receiving nozzles of the hollow blades. The sealing means is preferably a series of grooves cut in the rotating member and the inner member which it surrounds to form a labyrinth seal; the projections of one labyrinth structure can be designed to engage the grooves of the other, to completely close off the cyclic fluid flow path. Alternatively, the labyrinth configuration can be on only one member with sealing accomplished by the tortuous flow path set up.

OBJECTS OF THE INVENTION

Accordingly, it is an object of the present invention to provide sealing means for the cyclic fluid flow path in a circulation control rotor hub.

It is a further object of the present invention to provide a circulation control rotor whose cyclic fluid flow path can be completely closed.

It is a further object of the present invention to provide sealing means for the cyclic fluid flow path in a circulation control rotor that can be easily replaced.

It is a further object to provide a valve for a circulation control rotor which has a linear control characteristic.

It is a further object to provide a valve for a circulation control rotor which allows a finer degree of control over airflow.

Other objects of the present invention will be obvious from the following specification and accompanying drawings.

DESCRIPTION OF THE PREFERRED EMBODIMENT

Figure 1:
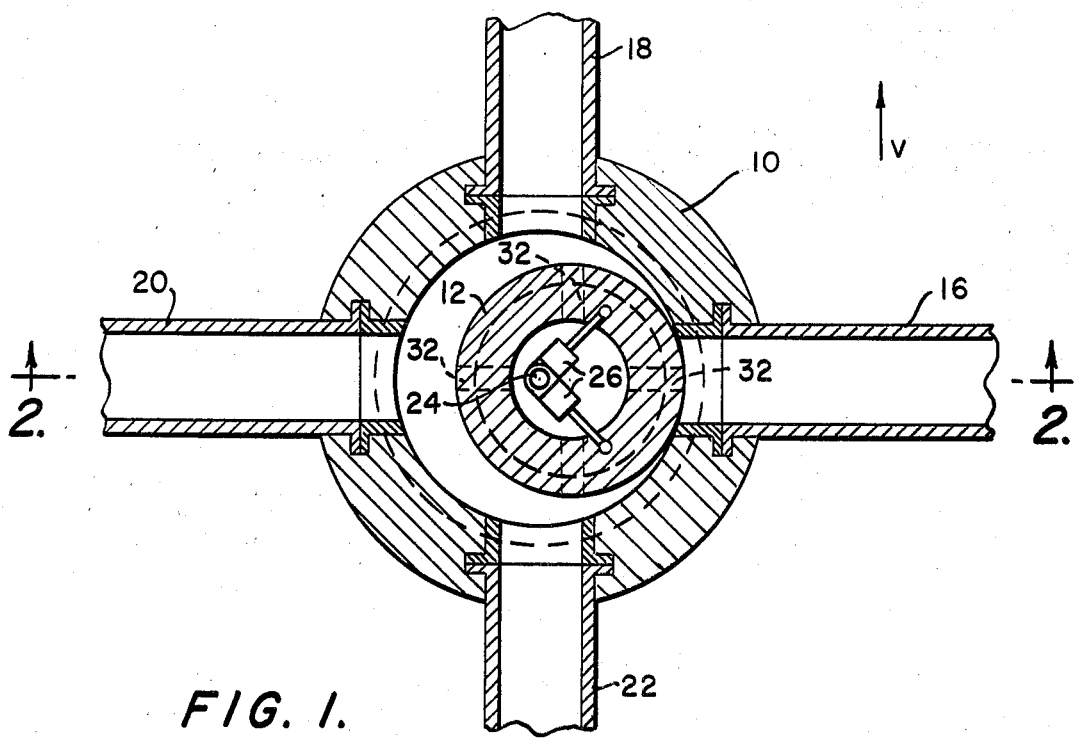
FIG. 1 is a top section view of a circulation control rotor according to the present invention.

FIG. 1 shows a top section view of a circulation control rotor hub comprising two main components - a rotating outer member 10 and a non-rotating inner member 12. Rotating outer member 10, powered by means (not shown) connected to shaft 14, carries a plurality of hollow blades 16–22 rigidly fixed thereto; blades 16–22 can be welded, bolted, or attached in any desired manner. Although four blades are shown in FIG. 1, it is to be understood that a rotor with any number of blades can utilize the present invention.

Inner member 12 is attached to central shaft 24 by means of hydraulic cylinders or other extensible members 26; these cylinders, placed at right angle to each other, allow inner member 12 to be placed at any desired location with respect to rotating outer member 10. Central shaft 24 is journalled in the top 28 of rotating outer member 10 at its center, as indicated at 30 in FIG. 2.

Figure 2:
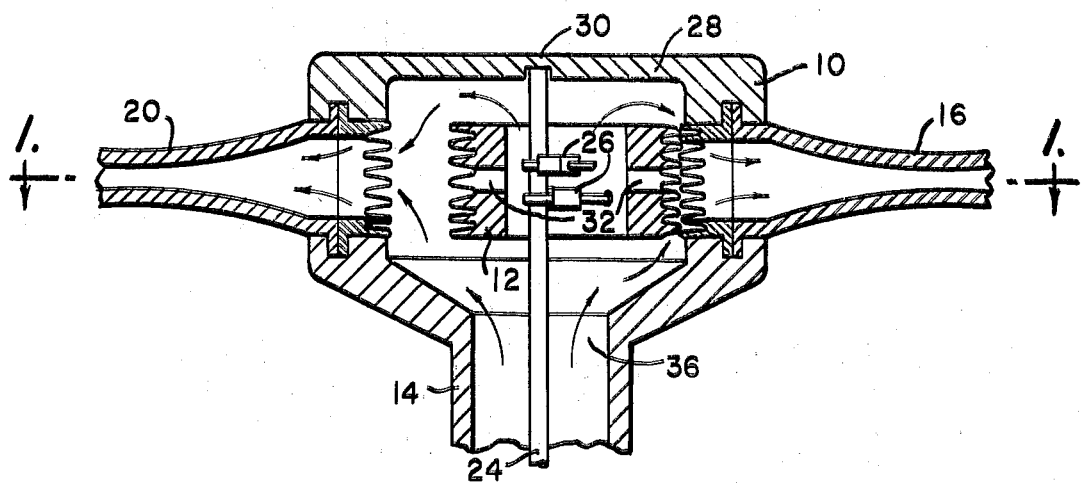
FIG. 2 is taken along line 2—2 of FIG. 1.

As shown in FIG. 2, the opposed faces of members 10 and 12 have been contoured to form labyrinth surfaces. These labyrinth surfaces are vertically off-set with respect to each other; that is, the two sets of surfaces will mesh with each other as shown in FIGS. 3 and 4 for a purpose to be explained later.

Inner member 12 may have passages 32 through it at intervals; these passages are for the purpose of supplying minimum collective pitch airflow, if desired, when the labyrinth surfaces are completely meshed, as will be explained later.

Figure 4:
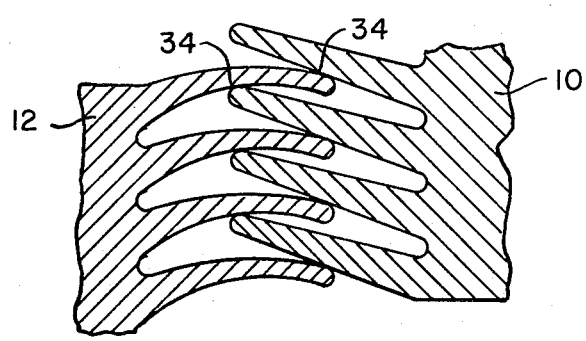
FIG. 4 shows the labyrinth seal members near total engagement.
Figure 3:
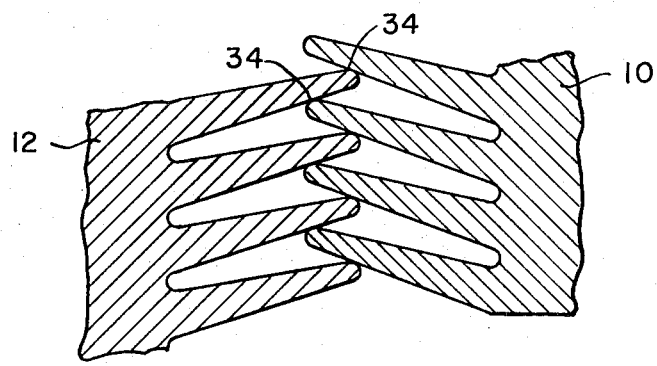
FIG. 3 shows the labyrinth seal members at the point of initial contact.

FIG. 3 shows the labyrinth surfaces at their point of initial contact, and FIG. 4 shows them near total engagement; from these it will be obvious that the labyrinth seal material should be flexible and possess a low coefficient of friction. Materials such as polyethylene, nylon, Teflon, and other plastics having flexibility and low coefficients of frictions are well suited for this purpose. Inner member 12 can be fabricated entirely of this material, since its only function is to direct air into blades 16–22. The labyrinth surface on the outer member, which extends over a portion of the entire periphery of the inside surface of outer member 10 except for the entrances to the hollow blades 16–22, can be formed in the metal surface of outer member 10. If desired, however, a plastic or metal insert (not shown) having the labyrinth surface can be fastened to the inside of inner member 10; this latter configuration would allow for easy replacement of the labyrinth surface. As shown in FIG. 4, there is sufficient flexibility in the labyrinth of inner member 12 alone to permit it to mesh with a rigid seal on outer member 10.

The details of design of the labyrinth are not critical. It is not necessary that there be contact between the members as indicated at 34 in FIGS. 3 and 4; if the members mesh without touching there will be sufficient restriction of the flow path to give the desired amount of control. Line contact sealing, as indicated at 34, is preferable, since this effects positive sealing with minimum friction; however, total contact sealing can be used where desired.

Since for most applications, the sealing surfaces of inner member 12 will be of plastic or other flexible material and the sealing surfaces of outer member 10 of metal, all wear will be on the surfaces of inner member 12. To replace the seals it is only necessary to replace inner member 12, which can be easily machined out of a solid block.

The operation of the valve is as follows, assuming that the helicopter is traveling in the direction of the arrow V in FIG. 1 and the blades are rotating counter-clockwise: Shaft 14 is rotated by some means (not shown), thereby causing blades 16–22 to rotate. Fluid for both cyclic and collective pitch control comes up within shaft 14 and enters plenum 36 within the rotor hub as shown by the arrows in FIG. 2. This pitch control fluid can be the exhaust gases from the internal combustion engine that rotates shaft 14, can be supplied by a separate air compressor, or can come from some other source; for convenience it will be designated air.

Blade 16 is the advancing blade, hence it needs less cyclic pitch control air than the other blades; therefore inner member 12 is offset toward blade 16 to reduce the air flow into it by reducing the gap between inner member 12 and the entrance to blade 16. Passage 32 remains open, however, thereby allowing a minimum amount of collective pitch control air into blade 16 at all times. Since blade 20 is the retreating blade, it requires a greater amount of cyclic pitch control air; this is automatically supplied by the increased air gap resulting from the offset of inner member 12 toward blade 16.

In the event that no cyclic pitch control air is wanted in the advancing blade, for instance when the helicopter is hovering in a strong headwind, inner member 12 can be offset toward blade 16 until the labyrinths mesh as in FIG. 4. At this time, blade 16 will receive collective pitch control air through passage 32 but no cyclic pitch control air; the lift of blade 16 will thus remain equal to that of blade 20.

When inner member 12 has reached the position shown in FIGS. 1 and 2, air flows into the blade radially through passage 32 and circumferentially between the labyrinth surfaces on members 10 and 12. As inner member 12 moves farther out radially toward outer member 10, the meshing labyrinths restrict the circumferential flow path somewhat like a parallel series of needle valves. This needle valve effect gives a very fine degree of control over airflow, and also provides the valve with a linear control characteristic; that is, each increment of displacement of inner member 12 changes airflow by the same amount.

If desired, the labyrinth surface on the outer rotating member 10 could be eliminated and the grooves in the seal of inner member 12 reduced in depth. When inner member 12 having this type of sealing surface is offset all the way toward blade 16, a very tortuous airflow path is set up; this tortuous airflow path causes such a large pressure drop that airflow into the blade is effectively stopped.

Likewise, the labyrinth surface on the inner member 12 could be eliminated; the same tortuous flow path would be again set up with the same result.

In the latter two cases, the material of member 12 would of course remain the same, to reduce friction.

When inner member 12 is held stationary the cyclic pitch control airflow to the blades is pulsed with the first harmonic; that is, each blade receives maximum airflow once each revolution. For some flight conditions it is desirable to impose second and higher order harmonics on the cyclic pitch control airflow; that is, to see that each blade receives maximum airflow more than once each revolution. If this is desired, shaft 24 can be mounted for rotation; it can be geared to main rotor shaft 14 so that it rotates at integral multiples of the speed of main rotor shaft 14 in both the same and the opposite directions. As shaft 24 rotates inner member 12 rotates with it; maximum cyclic pitch control airflow will then be directed to each blade a number of times each cycle corresponding to the ratio of the speeds of shafts 14 and 24.

Obviously many modifications and variations of the present invention are possible in the light of the above teachings. It is therefore to be understood that within the scope of the appended claims the invention may be practiced otherwise than as specifically described.

What is claimed is:

1. A rotor hub for a circulation control helicopter rotor comprising:
    an inner member;
    a rotating outer member surrounding said inner member and spaced therefrom to form a fluid flow passage;
    fluid receiving means in said rotating member; and
    sealing means between said inner member and said fluid receiving means, said sealing means comprising a labyrinth seal.

2. A rotor hub as in claim 1 wherein said sealing means is on said inner member only.

3. A rotor hub as in claim 1 wherein said sealing means is on said rotating member only.

4. A rotor hub as in claim 1 wherein said sealing means comprises cooperating seals, one on said inner member and one on said rotating member.

5. A rotor hub as in claim 4 wherein said cooperating seals comprise interdigitated labyrinth seals.

6. A rotor hub as in claim 1 having means for by-passing said sealing means.

7. A rotor hub as in claim 6 wherein said by-pass means comprises passages through said inner member, said passages communicating directly with said fluid receiving nozzles.

8. A hub for a circulation control rotor helicopter comprising:
    a rotating outer member carrying a plurality of hollow blades;
    means to direct collective pitch control fluid to the blades;
    means to direct cyclic pitch control fluid to the blades, said means comprising a translatable inner member; and
    means to prevent the admission of cyclic pitch control fluid to the blades.

9. A hub as in claim 8 wherein the means to direct collective pitch control fluid comprises a plurality of passages in said translatable inner member.

10. A hub as in claim 9 wherein the means to prevent the admission of cyclic pitch control fluid comprises a seal between said inner and said outer members.

11. A hub as in claim 10 wherein said seal comprises a labyrinth seal on said inner member.

12. A hub as in claim 10 wherein said seal comprises a labyrinth seal on said outer member.

13. A hub as in claim 10 wherein said seal comprises interdigitated labyrinth seals, one on said inner member and one on said outer member.

14. A hub as in claim 10 wherein said inner member is mounted for rotation independently of said outer member.

* * * * *